Figure 1:
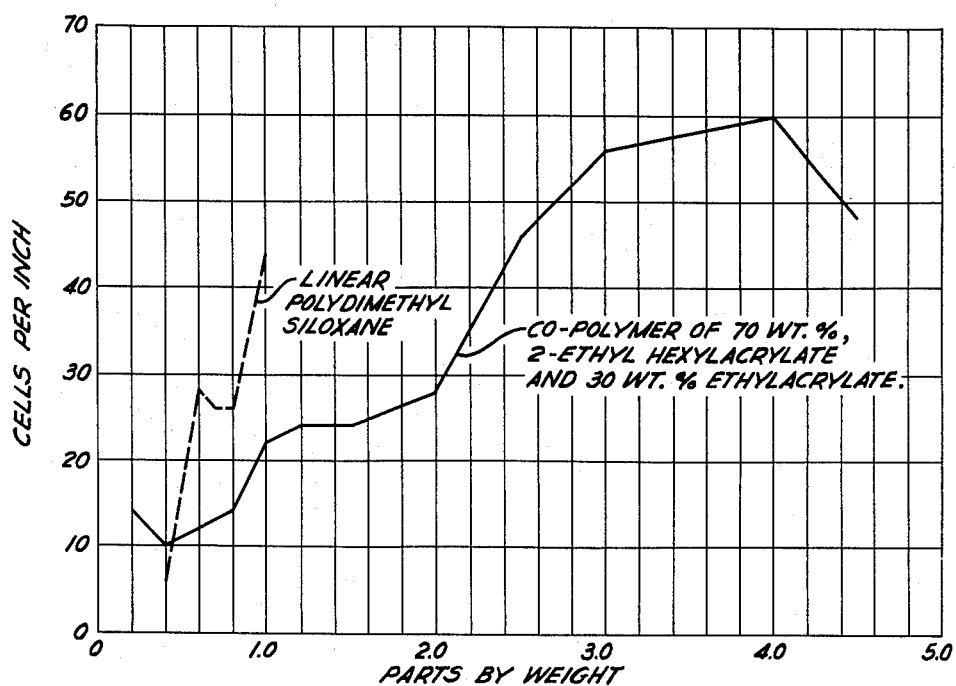

April 16, 1963   E. E. HARDY   3,085,983
PREPARATION OF CELLULAR POLYURETHANE PLASTICS
Filed Sept. 3, 1959

INVENTOR.
EDGAR E. HARDY
BY
ATTORNEY

United States Patent Office 3,085,983
Patented Apr. 16, 1963

3,085,983
PREPARATION OF CELLULAR POLYURETHANE PLASTICS
Edgar E. Hardy, Long Meadow, Mass., assignor to Mobay Chemical Company, Pittsburgh, Pa., a corporation of Delaware
Filed Sept. 3, 1959, Ser. No. 837,884
2 Claims. (Cl. 260—2.5)

The invention relates to an improved process for the manufacture of cellular polyurethane plastics from isocyanate-modified polyhydric polyalkylene ethers. More particularly, this invention relates to improved stabilizers for the reaction between water, an organic polyisocyanate and an isocyanate-modified polyhydric polyalkylene ether.

It has been proposed heretofore to employ substances which have become known as foam stabilizers in the preparation of cellular polyurethane plastics. However, the type of substance employed for this purpose depends on the active hydrogen containing compound employed and the method of their manufacture. A striking example of these different effects is found in the difference between the types of so-called stabilizers used in the preparation of cellular polyurethane plastics from water, organic polyisocyanates and hydroxyl polyesters and those used in the preparation of cellular polyurethane plastics from polyhydric polyalkylene ethers in place of the hydroxyl polyesters in a one-step process and in a two-step process wherein the polyhydric polyalkylene ether is reacted with an organic polyisocyanate to prepare an —NCO terminated product and thereafter foamed in a second step by reaction with water. It is not essential that a so-called stabilizer of any kind be used in the reaction with the hydroxyl polyesters but stabilizers have been found to be essential in both types of reaction with the polyhydric polyalkylene ethers.

In the preparation of cellular polyurethane plastics based on hydroxyl polyesters, it is not essential to use a foam stabilizer to obtain stable foam of usable cell structure. In other words, the reactants in an hydroxyl polyester system are sufficiently viscous to entrap the gas produced in the reaction and produce a stable cellular structure. The reason for using foam stabilizers in an hydroxyl polyester base system is to further stabilize the foam during the reaction to such an extent that precise control of the cell size may be obtained. Suitable additives for this purpose are disclosed in U.S. Patent 2,591,884 to Simon et al., issued April 8, 1952. The Simon patent discloses polymeric acrylate and methacrylate resins and their copolymers preparing by polymerizing the lower esters of acrylic and methacrylic acid as the polyester base cellular polyurethane plastic type of stabilizer.

In the preparation of cellular polyurethane plastics from water, organic polyisocyanates and polyhydric polyalkylene ethers, the problem appears at present to be almost exactly the opposite to that for polyesters. In the case of practical, commercial polyether systems, a foam stabilizer is essential to the formation of stable foam. Only those systems of extremely high initial viscosity have produced foam without an added stabilizer. Only silicone oils such as substantially linear polydimethyl siloxanes have proven effective for this purpose and even so, different types of silicones are employed depending on whether the reaction is carried out in a one-step process or in a two-step process as more particularly defined above. In these reactions, a silicone oil has been employed which will aid the resin in entrapping the gas and stabilize the cells until the foam is cured. The use of silicone oils in the preparation of cellular polyurethane plastics by the two-step process suffers from the disadvantage that only a very narrow concentration range can be used in most instances. This narrow range makes the foaming of the isocyanate-modified polyhydric polyalkylene ethers difficult because of the careful control which must be exercised over the proportion of silicone oil to the total amount of reactants employed.

It is an object of this invention to provide an improved process for the preparation of cellular polyurethane plastics. Another object of this invention is to provide an improved process for the preparation of a cellular polyurethane plastic from an isocyanate-modified polyhydric polyalkylene ether. Still another object of this invention is to provide a process for broadening the permissible range of concentration over which a foam stabilizing substance in a polyhydric polyalkylene ether base system may be used. Another object of this invention is to provide novel foam stabilizing substances for polyether base cellular polyurethane plastics obtained from isocyanate-modified polyhydric polyalkylene ethers and water.

The foregoing objects and others which will become apparent from the following description and the accompanying drawing are accomplished in accordance with this invention, generally speaking, by providing a process for the preparation of a cellular polyurethane plastic which comprises reacting water with an organic polyisocyanate-modified polyhydric polyalkylene ether while in admixture with a polymer of an alkyl ester or mixtures of alkyl esters of acrylic and/or methacrylic acid wherein the alkyl radical of at least one of said esters contains from about 4 to about 8 carbon atoms. Thus, this invention contemplates, in a preferred embodiment, a process for the preparation of a cellular polyurethane plastic by a process which comprises mixing from about 0.2 to about 4.5 parts by weight of a polymer of an alkyl ester or mixtures of alkyl esters of acrylic and/or methacrylic acid, wherein the alkyl group of at least one of said esters contains from about 4 to about 8 carbon atoms, with an isocyanate-modified polyhydric polyalkylene ether and water and allowing them to react while in admixture with said polymer.

The drawing is a line graph comparing the operable concentration ranges for a substantially linear polydimethyl siloxane and the polymers of acrylic and methacrylic acid.

Any suitable polymer of an alkyl ester of acrylic acid and/or methacrylic acid obtained from acrylic and/or methacrylic esters wherein the alkyl group of at least one of said esters contains from about 4 to about 8 carbon atoms, and preferably at least about 50 percent of said polymer being made up of acrylic and/or methacrylic acid esters having alkyl groups containing from about 4 to about 8 carbon atoms may be used. It is preferred to employ compounds in the preparation of the polymeric stabilizers of the present invention having the generic formula

wherein R may be hydrogen or methyl and R' is an alkyl radical having from 4 to 8 carbon atoms and may be either linear or branched in conjunction with compounds wherein R' is within the range of 1 to 3. The compounds of the above formula which make up the polymeric foam stabilizers of the present invention are, therefore, preferably made up of mixtures of compounds of the above-identified generic formula containing at least about 50 percent by weight of the component where R' is an alkyl radical within the range of from about 4 to about 8 carbon atoms and preferably at least about 70 percent by weight of said component, the balance of said components being made up of acrylic and/or methacrylic acid esters of the above-identified formula wherein R' is within the range of from 1 to 3 carbon atoms. One preferred compound is a copolymer of 2-ethyl hexyl acrylate and ethyl acrylate. Other suitable compounds containing alkyl groups having 4 to 8 carbon atoms include 2-ethyl hexylmethacrylate, n-hexyl acrylate, n-hexyl methacrylate, n-heptyl acrylate, n-heptyl methacrylate, iso-hexyl acrylate, iso-hexyl methacrylate, iso or n-butyl acrylate, iso or n-butyl methacrylate and the like. Other suitable compounds containing 1 to 3 carbon atoms are methyl acrylate, methyl methacrylate, ethyl methacrylate, n-propyl acrylate and the like. The acrylate and/or methacrylate polymers employed in accordance with the invention preferably have a molecular weight within the range of from about 1,000 to about 10,000 and most preferably of about 5,000.

Any suitable organic polyisocyanate may be used in the preparation of the organic polyisocyanate-modified polyhydric polyalkylene ether. Representative examples of polyisocyanates which may be used are arylene diisocyanates such as, for example, phenylene diisocyanate, p,p'-diphenyl methane diisocyanate, toluylene diisocyanate, and particularly mixtures of 2,4-toluylene diisocyanate and 2,6-toluylene diisocyanate, most advantageous results being obtained from a mixture of 80 percent 2,4-toluylene diisocyanate and 20 percent 2,6-toluylene diisocyanate, alkylene diisocyanates such as, for example, hexamethylene diisocyanate as well as other suitable organic polyisocyanates disclosed in United States Reissue Patent 24,514 to Hoppe et al., issued August 12, 1958.

Any suitable polyhydric polyalkylene ether may be used. Polyhydric polyalkylene ethers having from 2 to 4 hydroxyl groups are preferred. Suitable polyhydric polyalkylene ethers may be obtained from the condensation of an alkylene oxide such as, for example, ethylene oxide, propylene oxide, butylene oxide, amylene oxide and the like or such alkylene oxides with a small amount of an hydroxyl containing material such as, for example, water or a polyhydric alcohol, such as, for example, ethylene glycol, 1,3-propylene glycol, 1,4-butane diol, trimethylol propane, glycerol, 1,2,6-hexane triol, pentaerythritol, N,N,N',N' tetrakis (2-hydroxy propyl) ethylenediamine and the like. Any suitable polyhydric polyalkylene ether may be used as stated above, but it is preferred to employ polyhydric polyalkylene ethers having a molecular weight of at least about 500 and more preferably within the range of from about 500 to about 10,000 and most preferably within the range of about 1,000 to 5,000 and having an hydroxyl number of from about 25 to about 225 and preferably from about 50 to about 150. The polyhydric polyalkylene ethers employed in the process of the invention may be prepared by any known process, such as, for example, the process described by Wurtz in 1859 and in "Encyclopedia of Chemical Technology," vol. 7, pages 257–262, published by Interscience Publishers, Incorporated, 1951, or in U.S. Patent 1,922,459.

In carrying out the process of the present invention, the modified polyhydric polyalkylene ether is prepared in a first step under substantially anhydrous conditions and then mixed with water and the polymer of an acrylic and/or a methacrylic acid ester and allowed to react to form a cellular polyurethane plastic. It is preferred to carry out the reaction with water in the presence of a tertiary amine catalyst such as triethyl amine, N,N'-dimethyl piperazine, N,N'-diethyl piperazine, triethylene diamine, N-ethyl morpholine, N-methyl morpholine, dimethyl lauryl amine, methyl dilauryl amine, dilauryl amine and the like. Further, the process of the invention is advantageously carried out employing a mixer for the components of the cellular polyurethane plastic such as is disclosed for example in United States Reissue Patent 24,514 to Hoppe et al., issued August 12, 1958. Suitable reaction conditions and the like may be found in the aforementioned patent.

The cellular polyurethane plastics produced in accordance with this invention may be either rigid, semi-rigid or flexible. They may be used as either thermal or sound insulation, for cushions, crash pads for automobiles, shoe soles, carpet underlay, upholstery and the like.

The drawing indicates the broadened range of the novel stabilizer which may be employed as compared to a substantially linear polydimethyl siloxane containing up to 0.4 mole percent siloxane side chains. In the graph, the dotted line indicates the permissible range of concentration of the siloxane containing up to 0.4 mol percent siloxane side chains which will produce a satisfactory stabilization of the foaming reaction while the solid line indicates the permissible concentration of a polymer of an alkyl ester of acrylic or methacrylic acid. Concentrations below the minimum amount of siloxane shown, 0.4 part by weight, result in boiling without formation of a satisfactory cellular structure. Concentrations above the maximum amount, 1.0 part by weight, will stabilize the rise of the foaming mixture but the cellular structure will thereafter collapse yielding only a horny unusuable mass.

In order to better describe and further clarify the invention, the following are specific embodiments in which the parts are by weight.

*Example 1*

An isocyanate-modified polyhydric polyalkylene ether was prepared by the reaction of a mixture of about 60 parts of a polypropylene ether glycol having a molecular weight of about 2,000 and an hydroxyl number of about 56 with about 40 parts by weight of a trihydric polyalkylene ether obtained from the reaction of about 1 part of glycerine with about 30 parts of propylene oxide condensed to a molecular weight of about 3,000 and having an hydroxyl number of about 56 with about 12.5 parts of a mixture of 80 percent 2,4-toluylene diisocyanate and 20 percent 2,6-toluylene diisocyanate in a first addition until the temperature had risen to about 115° C. Then in a second step, an additional 27.5 parts of the 80:20 mixture of toluylene diisocyanate was added to the reaction product of the first step and allowed to cool to room temperature. At this point, the isocyanate-modified polyhydric polyalkylene ether had a viscosity of about 8,500 cps./25° C. and the free —NCO content was about 10.3 percent. To 100 parts of this isocyanate-modified polyhydric polyalkylene ether was added about 0.3 parts of triethyl amine, about 3 parts of ethyl morpholine, about 2.2 parts water and about 0.2 part of a copolymer of 70 percent by weight of 2-ethyl hexyl acrylate and 30 percent by weight ethyl acrylate. The reactants were combined in a machine mixer as disclosed in United States Reissue Patent 24,514, issued August 12, 1958 to Hoppe et al.

The resulting cellular polyurethane plastic had the following physical properties:

| | |
|---|---|
| Tensile strength: (lbs./in.$^2$) | 15–18 |
| Density: (lbs./ft.$^3$) | 2 |
| Elongation at break: (percent) | 230–250 |
| Compression deflection: (lbs./in.$^2$) | 0.4 at 25% R |
| Compression set: (percent) | 10 |
| Cell size, no./in. | 15–20 |

*Example 2*

To 100 parts of the isocyanate-modified polyhydric polyalkylene ether prepared in accordance with the process of Example 1 are added about 0.3 part triethyl amine, 3 parts ethyl morpholine, 2.2 parts water and 4.5 parts of a copolymer of 70 percent by weight 2-ethyl hexyl acrylate and 30 percent by weight ethyl acrylate. The reactants were combined in a machine mixer as disclosed in United States Reissue Patent 24,514, issued August 12, 1958, to Hoppe et al.

The resulting cellular polyurethane plastic had the following physical properties:

| | |
|---|---|
| Tensile strength: (lbs./in.²) | 18–20 |
| Density: (lbs./ft.³) | 2 |
| Elongation at break: (percent) | 280–300 |
| Compression deflection: (lbs./in.²) | 0.4 at 25% R |
| Compression set: (percent) | 10 |
| Cell size, no./in. | 45–50 |

*Example 3*

An isocyanate-modified polyhydric polyalkylene ether was prepared by reacting about 100 parts of a polypropylene ether glycol having a molecular weight of about 2,000 and an hydroxyl number of about 56 with about 28 parts of a mixture containing 80 percent 2,4-toluylene diisocyanate and 20 percent 2,6-toluylene diisocyanate until a viscosity of about 12,000 cps. at 25° C. and a free —NCO content of about 6.8 percent was reached. 100 parts by weight of this isocyanate-modified polyhydric polyalkylene ether was then mixed with about 0.2 part of a copolymer of 70 percent by weight of 2-ethyl hexyl acrylate and 30 percent by weight ethyl acrylate. The reactants were combined in a machine mixer as disclosed in United States Reissue Patent 24,514, issued August 12, 1958, to Hoppe et al.

The resulting cellular polyurethane plastic had the following physical properties:

| | |
|---|---|
| Tensile strength: (lbs./in.²) | 18–20 |
| Density: (lbs./ft.³) | 2 |
| Elongation at break: (percent) | 300–350 |
| Compression deflection: (lbs./in.²) | 0.3 at 25% R |
| Compression set: (percent) | 10 |
| Cell size, no./in. | 15–20 |

*Example 4*

About 100 parts of the isocyanate-modified polyhydric polyalkylene ether prepared in accordance with the process of Example 3 was combined with about 0.2 parts ethyl morpholine, 2.2 parts water and 4.5 parts by weight of a copolymer of 70 percent by weight of 2-ethyl hexyl acrylate and 30 percent by weight ethyl acrylate. The reactants were combined in a machine mixer as disclosed in United States Reissue Patent 24,514, issued August 12, 1958, to Hoppe et al.

The resulting cellular polyurethane plastic had the following physical properties:

| | |
|---|---|
| Tensile strength: (lbs./in.²) | 23–25 |
| Density: (lbs./ft.³) | 2 |
| Elongation at break: (percent) | 350–400 |
| Compression deflection: (lbs./in.²) | 0.3 at 25% R |
| Compression set: (percent) | 10 |
| Cell size, no./in. | 45–50 |

Although the foregoing examples utilize copolymers of 70 percent by weight 2-ethyl hexyl acrylate and 30 percent by weight ethyl acrylate, it is to be understood that any other suitable polymer of an alkyl ester or mixtures of alkyl esters of acrylic and/or methacrylic acid wherein at least one of the alkyl radicals of said esters contains from about 4 to about 8 carbon atoms could be used with equally satisfactory results. Further, any other suitable organic polyisocyanate and/or polyhydric polyalkylene ether, catalyst and the like could have been used in the foregoing examples with equally satisfactory results.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. In the manufacture of cellular polyurethane plastics by a process which comprises reacting water with an organic polyisocyanate modified polyhydric polyalkylene ether containing terminal —NCO groups, said polyhydric polyalkylene ether having from 2 to 4 hydroxyl groups, the improvement which comprises mixing said water and said polyisocyanate modified polyhydric polyalkylene ether with from about 0.2 to about 4.5 parts per hundred parts of polyisocyanate modified polyhydric polyalkylene ether of a polymer having a molecular weight within the range of from about 1000 to about 10,000 which has been obtained by the polymerization of ethyl acrylate and at least about 50 percent by weight of 2-ethyl hexyl acrylate.

2. The process of claim 1 wherein said polymer is a copolymer of 70 percent 2-ethyl hexyl acrylate and 30 percent ethyl acrylate.

References Cited in the file of this patent

UNITED STATES PATENTS

| | | |
|---|---|---|
| 2,591,884 | Simon et al. | Apr. 8, 1952 |
| 2,764,565 | Hoppe et al. | Sept. 25, 1956 |
| 2,879,233 | Pace | Mar. 24, 1959 |
| 2,962,455 | Hostettler et al. | Nov. 29, 1960 |